(12) United States Patent
Mordukhovich et al.

(10) Patent No.: US 9,212,703 B2
(45) Date of Patent: Dec. 15, 2015

(54) TORQUE-TRANSMITTING DEVICE HAVING A DIMPLED FRICTION PLATE

(75) Inventors: Gregory Mordukhovich, Bloomfield Hills, MI (US); Sergei Glavatskikh, Lulea (SE)

(73) Assignee: GM Global Technology Operations, LLC, Detroit, MI (US)

( * ) Notice: Subject to any disclaimer, the term of this patent is extended or adjusted under 35 U.S.C. 154(b) by 1095 days.

(21) Appl. No.: 11/832,818

(22) Filed: Aug. 2, 2007

(65) Prior Publication Data

US 2009/0032356 A1 Feb. 5, 2009

(51) Int. Cl.
- *F16D 13/64* (2006.01)
- *F16D 13/74* (2006.01)
- *F16D 69/00* (2006.01)

(52) U.S. Cl.
CPC ............... *F16D 13/74* (2013.01); *F16D 13/64* (2013.01); *F16D 69/00* (2013.01); *F16D 2069/004* (2013.01)

(58) Field of Classification Search
CPC .... F16D 13/74; F16D 2069/004; F16D 13/64
USPC .......... 192/113.36, 52.6, 70.14, 107 C, 70.12
See application file for complete search history.

(56) References Cited

U.S. PATENT DOCUMENTS

| | | | |
|---|---|---|---|
| 1,132,958 A * | 3/1915 | Miller .................... | 192/70.12 |
| 1,833,414 A | 11/1931 | Cram | |
| 3,841,949 A * | 10/1974 | Black ......................... | 428/66.2 |
| 4,042,085 A * | 8/1977 | Bjerk et al. ................... | 192/57 |
| 4,667,534 A * | 5/1987 | Kataoka ...................... | 475/160 |
| 5,004,089 A * | 4/1991 | Hara et al. ................ | 192/107 M |
| 5,048,659 A * | 9/1991 | Tojima ...................... | 192/107 C |
| 5,094,331 A * | 3/1992 | Fujimoto et al. ........... | 192/70.12 |
| 5,834,094 A | 11/1998 | Etsion | |
| 6,029,791 A * | 2/2000 | Takakura .................. | 192/107 M |
| 6,341,782 B1 | 1/2002 | Etsion | |
| 6,572,479 B1 * | 6/2003 | Saito et al. ..................... | 464/46 |
| 2004/0050646 A1 | 3/2004 | Matthes et al. | |

FOREIGN PATENT DOCUMENTS

| | | |
|---|---|---|
| DE | 1575906 B | 11/1970 |
| DE | 4443096 C1 | 5/1996 |
| EP | 0758722 A2 | 2/1997 |
| JP | 60-164048 A | 8/1985 |
| JP | 2004211781 A | 7/2004 |

* cited by examiner

*Primary Examiner* — Robert Hodge
*Assistant Examiner* — Terry Chau

(57) ABSTRACT

A clutch including a reaction plate configured to exert a compression force. The clutch further includes a friction plate having a surface opposing the reaction plate. A friction material layer has a first surface attached to the surface of the friction plate, and a second surface opposing the reaction plate. The second surface of the friction material layer has a plurality of dimples formed therein. Further, a lubrication fluid is disposed between the reaction plate and the friction material layer for transferring the compression force and providing a lubrication layer between the reaction plate and the friction plate.

10 Claims, 2 Drawing Sheets

TORQUE-TRANSMITTING DEVICE HAVING A DIMPLED FRICTION PLATE

FIELD

The present invention relates to a torque-transmitting device and to clutches or brakes for controlling the operation of mechanisms such as a transmission.

BACKGROUND

Torque-transmitting devices such as clutches or brakes are heavily used throughout the automotive industry. For example, vehicle transmissions employ a multitude of clutches to engage and disengage the gearsets of the transmission to provide forward and reverse gear ratios. The clutch includes a reaction plate for exerting a compression force. The clutch also includes a friction plate disposed adjacent the reaction plate for frictionally engaging the reaction plate to transfer a driving torque between the reaction plate and the friction plate when the compression force is applied. The clutch further includes a friction material layer adhered to the friction plate that opposes the reaction plate. The friction material layer is configured to be compressible by the reaction plate. The clutch further includes a fluid lubricant disposed between the reaction plate and the friction plate for providing a lubrication layer between the plates during clutch engagement.

Three dominant lubrication states exist during clutch engagement: hydrodynamic (HD), soft elasto-hydrodynamic (soft-EHL) and boundary. Hydrodynamic lubrication state is characterized by a thick fluid film thickness, low nominal contact pressure of the plates of the clutch, and an extremely low coefficient of traction/friction. Thus, torque transfer during in the hydrodynamic lubrication state is difficult to achieve.

During the soft elasto-hydrodynamic lubrication state, the sharp groove edges and/or rough fibers topography of the friction material operates to break through the hydrodynamic film and create islands of film separating the mating surfaces of the clutch plates. The islands are unevenly distributed over the surface area due to the non-homogenous nature of friction material, waviness of the plates and uneven load distribution. Since the nominal load on the friction plate is constant, the islands of fluid experience much greater pressure than exists in the hydrodynamic state. As the lubrication fluid becomes thinner its shear rate rapidly increases, which allows sufficient torque to be transferred through the fluid.

During the boundary lubrication state the soft-EHL fluid experiences break down due to a speed decrease and temperature rise. Further, the active additives in the surface of the friction material layer are activated and create a low-shear protective layer of fluid, which acts like a solid lubricant which interacts with the friction material layer to create a solid to solid coefficient of friction which is closer to the EHL value. A tribo-chemical layer is resultant of chemical reaction between the fluid lubricant additives and mating surfaces of the clutch plates. When the fluid lubricant deteriorates, the tribo-chemical layer undergoes shearing. The chemical bonds break-down, additives in the fluid are depleted. The tribo-chemical layer is replenished by using new non-depleted additives from the fluid. As additive concentration in the fluid decrease below a predefined critical level, the local coefficient of friction increases in magnitude and leads to uneven clutch engagement (shudder or stick/slip) or further temperature increase. Provided the temperature increases, the high temperature may result in damage to the friction material (wear, tearing, and glazing). The reaction plate may also be damaged which may include hot spotting.

The soft-EHL is the optimum state for clutch operation for the following reasons: (1) The thin fluid film traction provides friction coefficients sufficient to transfer the required torque. (2) The thin film traction does not generate excessive heat, which may damage the friction material (wear, tearing and glazing) and reaction plate (hot spotting) leading to the loss of friction and resulting in shudder. (3) The surface active friction modifiers are not consumed during the soft-EHL, so fluid deterioration is delayed. As long as fluid base stock is chosen from high level grades, the bulk oxidation is not primary failure mode of the clutch up to a fluid sump temperature of 135 degrees Celsius. (4) Fluid film as well as friction material have damping capabilities that reduce the amplitude of friction interface self-induced and/or external vibration. (5) The traction/friction coefficient is proportional to the viscous drag, which decreases with increasing temperature (this is typical for the clutch engagement cycle) positive friction/slip slope. (6) Compared to other lubrication regimes, the clutch can operate in the soft-EHL mode for sufficiently long periods of time without any damage or failure of the mating surface.

There is a need in the art to provide a new and improved clutch that prolongs the soft EHL state during clutch engagement. The new and improved clutch should maintain a sufficient coefficient of friction and not create excessive heat that will damage the friction material layer of the clutch.

SUMMARY

The present invention provides a clutch including a reaction plate configured to exert a compression force. The clutch further includes a friction plate having a surface opposing the reaction plate. The clutch further includes a friction material layer having a first surface attached to the surface of the friction plate, and a second surface opposing the reaction plate. The second surface includes a plurality of dimples formed therein. The clutch further includes a lubrication fluid disposed between the reaction plate and the friction material layer for transferring the compression force and providing a lubrication layer between the reaction plate and the friction plate.

The invention prolongs the soft-EHL regime during engagement, increases the actual area of contact during the soft-EHL lubrication regime, and decreases the actual contact pressure of the mating surfaces during the soft-EHL lubrication regime.

Further areas of applicability will become apparent from the description provided herein. It should be understood that the description and specific examples are intended for purposes of illustration only and are not intended to limit the scope of the present disclosure.

DRAWINGS

FIG. 3b is a magnified view of an dimple shown in FIG. 3a; and

DETAILED DESCRIPTION

Figure 1:
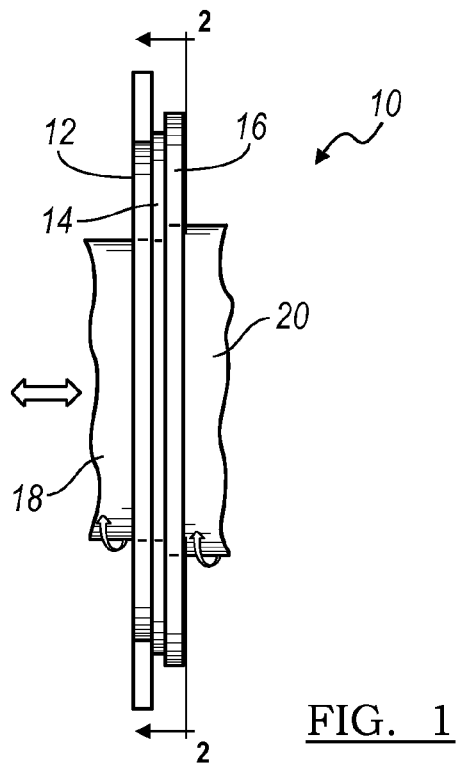
FIG. 1 is a side view of a torque transmitting device connected between a drive shaft and a driven shaft, in accordance with an exemplary embodiment of the present invention.

Referring to the drawings, wherein like reference numbers refer to like components, in FIG. 1 a side view of a torque-transmitting device 10 is shown, in accordance with an exemplary embodiment of the invention. Torque-transmitting device 10 is commonly referred to in automotive applications as a clutch or brake. Torque-transmitting device 10 has a first plate or friction plate 12 and a second plate or reaction plate 16. Friction plate 12 is separated from the reaction plate 16 by a layer of lubrication fluid 14. The lubrication fluid 14 is disposed between the friction plate 12 and the reaction plate 16, and is used to provide a lubrication barrier between the plates 12 and 16.

The torque-transmitting device 10 is connected between a drive shaft 18 and a driven shaft 20. More particularly, the friction plate 12 is coupled to the drive shaft 18 and the reaction plate 16 is coupled to the driven shaft 20. The drive shaft 18 is typically connected to a torque-producing device such as an internal combustion engine (not shown). The driven shaft 20 may be connected to a planetary gearset (not shown) for transmitting a driving torque from the engine to the planetary gearset to drive the wheels of a vehicle. However, either plate 12, 16 of the torque transmitting device 10 may also be connected to a rotating member or to a non-rotating member. Both the friction plate 12 and the reaction plate 16 are made of steel or a similar material. However, it should be appreciated by one skilled in the art that the present invention may be applied to plates made of different materials, such as metal alloys, composites or the like.

Figure 2:
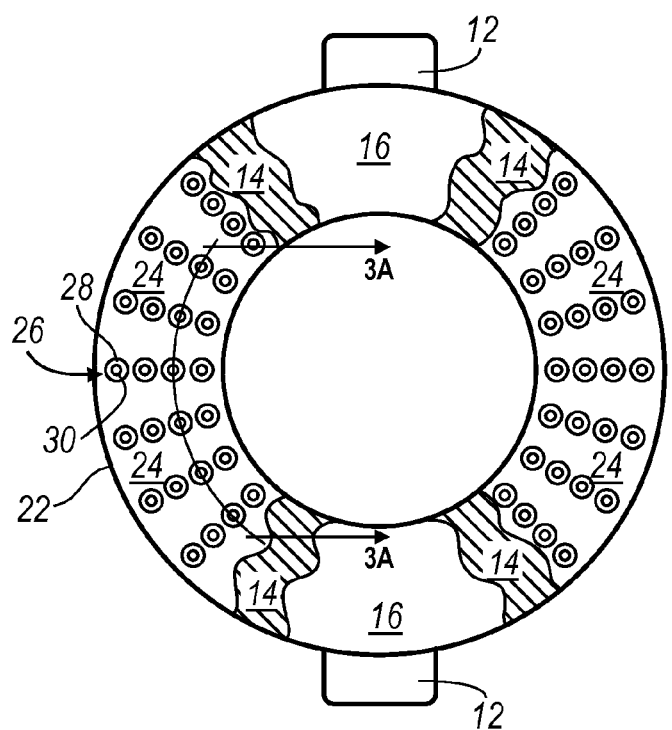
FIG. 2 is a partial cutaway view of the torque transmitting device of FIG. 1, in accordance with an exemplary embodiment of the present invention.

Referring now to FIG. 2, a partial cutaway view of the torque-transmitting device 10 of FIG. 1 is shown, in accordance with the exemplary embodiment of the present invention. Portions of reaction plate 16 have been removed to reveal the lubrication layer 14 and a friction material layer 22. The friction material layer 22 is attached to a surface 23 of the friction plate 12. The friction material layer 22 may be one of a variety of friction materials commonly used in torque-transmitting mechanisms today. However, the present invention contemplates that the friction material layer 22 shall be made of cellulose, Kevlar, and resin or any combination of these materials in varying percentages by weight that may or may not be in use in present clutch applications. The friction material layer 22 is a compressible resilient material that will return to its initial height and shape prior to being compressed by reaction plate 16, provided the friction material layer 22 is not compressed beyond its elastic limit.

In the preferred embodiment of the present invention, the friction material layer 22 includes a plurality of raised dimples or raised indentations 26 formed on a top surface 24 of the friction material layer 22. The dimples 26 are arranged within a predefined pattern and equally spaced apart over the top surface 24 of the friction material layer 22. As shown, the dimples 26 are radially aligned. It should be appreciated that the dimples 26 may be arranged in a multitude of patterns including a random pattern. The density of dimples 26 over the top surface 24 may also be varied depending on the particular application or desired performance criteria.

Figure 3A:
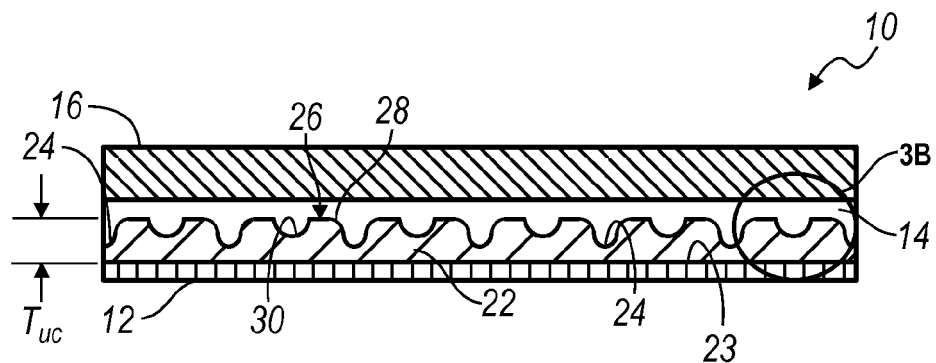
FIG. 3a is a magnified partial cross-sectional view of the torque transmitting device of FIG. 1 having a plurality of dimples formed on a top surface of a friction material layer shown in FIG. 2, in accordance with the exemplary embodiment of the present invention.
Figure 3B:
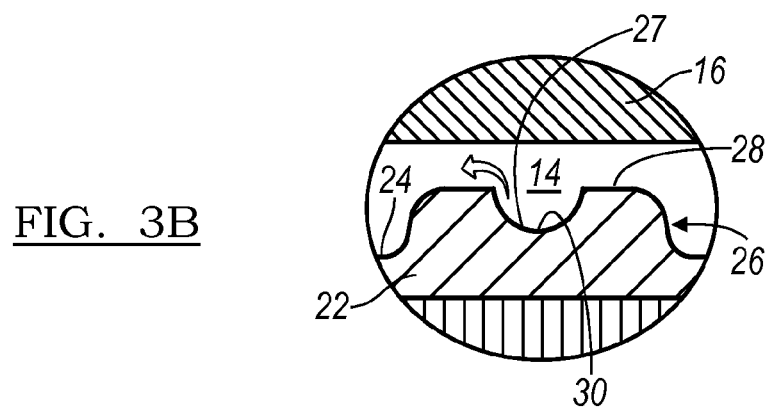

Referring now to FIGS. 3a and 3b, a partial cross-sectional view of the torque-transmitting device 10 through a plurality of dimples 26 is shown in FIG. 3a. Furthermore, a magnified view of a dimple 26 is shown in FIG. 3b. Each dimple 26 includes a substantially circular rim or annular flange 28. The rim 28 has a predefined height relative to the top surface 24 of the friction material layer 22. Each dimple 26 further includes a cavity 30 defined by the rim 28. Each cavity 30 has a substantially rounded bottom surface. However, it should be appreciated that the bottom surface of the cavity 30 may be formed with a different shape. Each dimple 26 is formed such that the cavity 30 is deep enough to retain the lubrication fluid 14 during the clutch activation taking into consideration the elasto-plastic deformation and wear of the friction material layer 22. However, the predefined depth of each cavity 30 allows the lubrication fluid 14 to bleed over the rim 28. During clutch engagement 10, the lubrication fluid 14 is squeezed or forced out of the cavity 30 and flows over the rim 28 onto the top surface 24 of the friction material layer 22 to create a thin film of lubrication fluid between layer 22 and plate 16. Each rim 28 operates to penetrate the thin film of lubrication fluid 14, which increases the area of contact between the friction material layer 22 and the reaction plate 16.

As shown in FIG. 3a, the torque-transmitting device 10 is in a non-engaged state. During the non-engaged state the reaction plate 16 does not contact the friction material layer 22, and therefore no load is transferred. As shown, the friction material layer 22 is uncompressed. During the non-engaged state the friction material layer 22 has a thickness of $T_{uc}$. More particularly, when force is applied to the torque-transmitting device 10, the dimples 26 and the friction material layer 22 are compressed. The rim 28 of each dimple 26 has a predefined height relative to the top surface of the friction material layer 22. The height of each rim 28 prevents the friction material layer 22 from being compressed beyond a predefined elastic zone.

Figure 3C:
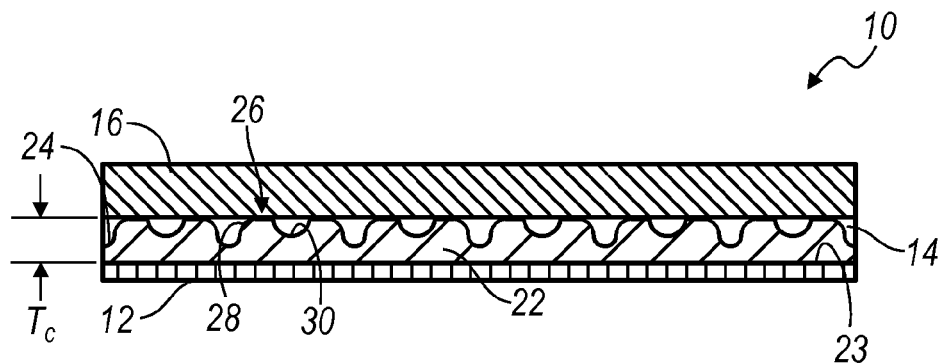
FIG. 3c is a magnified cross-sectional view of the torque transmitting device of FIG. 1 having the plurality of dimples shown in FIG. 3a and in a state of engagement, in accordance with an exemplary embodiment of the present invention.

Referring now to FIG. 3c, a partial cross-sectional view of the torque transmitting device 10 of FIG. 3a is shown, in accordance with the exemplary embodiment of the present invention. As shown, the torque transmitting device 10 is in an engaged state. During the engaged state the reaction plate 16 and the friction plate 12 are moved towards each other. More particularly, the reaction plate 16 contacts the dimples 26 and compresses the friction material layer 22. As a result of the compression, the lubrication fluid 14 will be forced out of the cavity 30. Moreover, each rim 28 of each dimple 26 penetrates the lubrication fluid 14 forced out of the cavity 30, which results in the load being distributed evenly over the entire top surface 24 of the friction material layer 22.

In conclusion, the present invention has many advantages and benefits over the prior art. The teachings of the present invention may be employed to overcome many problems found in prior art torque-transmitting devices 10. For example, the dimples 26 break through the film during the initial state of engagement, which increases the area of contact between the reaction plate 16 and the friction material layer 22, and decreases the contact pressure between the reaction plate 16 and the friction plate 12. The dimples 26 also distribute the load evenly over the entire portion of the top surface 24 of the friction material layer 22. The dimples 26 also prolong the soft-EHL state by retaining the lubrication fluid 14 within the cavities 30 and distributing the necessary amount over the friction material layer 22. Additionally, the dimples 26 prevent the frictional material layer 22 from overheating, because the lubrication fluid 14 is collected within the cavities 30 and evenly dispersed over the friction material layer 22 on an as needed basis during compression of the friction material layer 22. The dimples 26 minimize the amount of fluid necessary for the torque-transmitting device 10 to operate optimally, which decreases the required oil pump capacity during operation of the torque-transmitting device 10. The dimples 26 also prolong the slip time without shudder, and increase the torque-transmitting device 10 power density without shudder.

The description of the invention is merely exemplary in nature and variations that do not depart from the gist of the invention are intended to be within the scope of the invention. Such variations are not to be regarded as a departure from the spirit and scope of the invention.

What is claimed is:

1. A clutch comprising:
   a reaction plate configured to exert a compression force;
   a friction plate having a surface opposing the reaction plate;
   a friction material layer having a first surface attached to the surface of the friction plate, and a flat, planar second surface opposing the reaction plate, wherein the second surface has a plurality of raised dimples disposed therein, wherein each of the plurality of dimples includes an annular flange and a cavity defined by the annular flange, wherein the entire cavity is disposed above the planar second surface of the friction material layer; and
   a lubrication fluid disposed between the reaction plate and the friction material layer for transferring the compression force and providing a lubrication layer between the reaction plate and the friction plate.

2. The clutch of claim 1 wherein the friction material layer is an elastic material.

3. The clutch of claim 1 wherein each cavity is formed to hold the lubrication fluid.

4. The clutch of claim 1 wherein the plurality of raised dimples is arranged in at least one of (i) a predefined pattern and (ii) a random pattern, on the second surface of the friction material layer.

5. The clutch of claim 4 wherein the plurality of raised dimples is arranged in the predefined pattern.

6. The clutch of claim 5 wherein the plurality of raised dimples is radially aligned.

7. The clutch of claim 4 wherein the plurality of raised dimples is arranged in the random pattern.

8. The clutch of claim 1 wherein the annular flange of each of the plurality of raised dimples operates to penetrate the film of lubrication fluid.

9. The clutch of claim 1 wherein the cavity has a substantially rounded bottom surface.

10. A clutch comprising:
    a reaction plate configured to exert a compression force;
    a friction plate having a surface opposing the reaction plate, wherein the clutch has an engaged state and an unengaged state, wherein the reaction plate transfers torque to the friction plate in the engaged state and no torque is transferred from the reaction plate to the friction plate in the unengaged state;
    a friction material layer having a first surface attached to the surface of the friction plate and a planar second surface opposing the reaction plate, wherein a plurality of annular flanges are disposed on the planar second surface and each annular flange defines a cavity disposed within the annular flange, wherein a top of each of the annular flanges is a first predefined height above the second surface of the friction material layer and an absolute bottom of the cavity is a second predefined height above the second surface, wherein the first predefined height is greater than the second predefined height to elevate each of the cavities above the second surface; and
    a lubrication fluid disposed between the reaction plate and the friction material layer for transferring the compression force and providing a lubrication layer between the reaction plate and the friction plate;
    wherein when the clutch is in the unengaged state a first amount of lubrication fluid is in a subset of the cavities and when the clutch is in the engaged state the annular flange is compressed by the reaction plate, a portion of the lubrication fluid is forced out of the subset of cavities, and a second amount of lubrication fluid is retained within the subset of cavities.

* * * * *